(12) United States Patent
Attee

(10) Patent No.: US 6,578,801 B2
(45) Date of Patent: Jun. 17, 2003

(54) GRIPPER MOUNTING BRACKET

(75) Inventor: Keith S. Attee, Charlevoix, MI (US)

(73) Assignee: Delaware Capital Formation, Inc., DE (US)

( * ) Notice: Subject to any disclaimer, the term of this patent is extended or adjusted under 35 U.S.C. 154(b) by 0 days.

(21) Appl. No.: 09/756,424

(22) Filed: Jan. 8, 2001

(65) Prior Publication Data

US 2002/0104930 A1 Aug. 8, 2002

Related U.S. Application Data

(60) Provisional application No. 60/187,339, filed on Mar. 6, 2000.

(51) Int. Cl.$^7$ ................................................ F16L 3/08
(52) U.S. Cl. ............... 248/74.4; 248/68.1; 248/288.31; 269/75; 269/277; 269/282; 294/88; 403/373
(58) Field of Search ............................... 248/68.1, 74.1, 248/74.4, 288.31, 230.1, 230.8, 229.17, 315, 316.1; 403/344, 389, 373, 90; 362/72; 269/277, 282, 75

(56) References Cited

U.S. PATENT DOCUMENTS

| 229,670 A | 7/1880 | Carrick |
| 230,826 A | 8/1880 | Scofield |
| 320,436 A | 6/1885 | Hock |
| 377,114 A | 1/1888 | Pague |
| 490,150 A | 1/1893 | Low |
| 659,532 A | 10/1900 | Jordan |
| 688,230 A | 12/1901 | Isgrig et al. |
| 746,360 A | 12/1903 | McAdams |
| 1,468,110 A | 9/1923 | Howe |
| 1,472,566 A | 10/1923 | Oishei |
| 1,494,033 A | 5/1924 | Stevens |
| 1,543,037 A | 6/1925 | Teeter |
| 1,590,227 A | 6/1926 | Britton |
| 1,929,807 A | 10/1933 | Casper ........................... 74/17 |
| 1,940,258 A | 12/1933 | Lautz ............................ 29/84 |
| 1,955,226 A | 4/1934 | Chavannes .................... 309/20 |
| 1,986,149 A | 1/1935 | Harris ........................ 280/33.1 |

(List continued on next page.)

OTHER PUBLICATIONS

Exhibit B—CPI Catalog (2 pages).
Exhibit C—1993 ISI Double Rod Mount Drawing (1 page).
Exhibit D—1993 ISI Catalog (3 pages).

Primary Examiner—Anita King
Assistant Examiner—Tan Le
(74) Attorney, Agent, or Firm—Van Dyke, Gardner, Linn & Burkhart, LLP

(57) ABSTRACT

A gripper or workpiece holder mounting bracket includes a center element and a pair of opposite end elements which are connectable to the center element via one or more fasteners. The mounting bracket defines a generally circular opening between the center element and one of the end elements and defines a second opening between the center element and other end element which has an arcuate or curved cross section, whereby a truncated spherical swivel member is pivotably secured therein when the bracket elements are secured together. The gripper or workpiece holder is pivotally secured within the generally circular opening, while the swivel member receives a generally cylindrical support structure therethrough. Adjustment of a clamping force at either or both of the openings of the mounting bracket may be accomplished via loosening of a single fastener.

24 Claims, 2 Drawing Sheets

U.S. PATENT DOCUMENTS

| | | | |
|---|---|---|---|
| 2,081,749 A | 5/1937 | Kritzler et al. | 309/16 |
| 2,141,945 A | 12/1938 | Tweedale | 103/162 |
| 2,168,988 A | 8/1939 | Hultquist | 248/181 |
| 2,188,514 A | 1/1940 | Moore | 248/181 |
| 2,198,623 A | 4/1940 | Kastler | 309/16 |
| 2,212,156 A | 8/1940 | Erdley | 24/81 |
| 2,295,051 A | 9/1942 | Roth | 24/81 |
| 2,381,657 A | 8/1945 | Eksergian et al. | 294/88 |
| 2,452,406 A | 10/1948 | Volkery et al. | 24/81 |
| 2,469,542 A | 5/1949 | Becker | 24/81 |
| 2,499,136 A | 2/1950 | Edlund et al. | 296/85 |
| 2,651,026 A | 9/1953 | Roth | 339/246 |
| 2,769,895 A | 11/1956 | Boord | 240/6.41 |
| 2,776,168 A | 1/1957 | Schweda | 299/73 |
| 2,791,623 A | 5/1957 | Lock et al. | 174/94 |
| 2,825,601 A | 3/1958 | Doty | 296/97 |
| 2,858,522 A | 10/1958 | Wengen et al. | 339/264 |
| 3,055,398 A * | 9/1962 | Tunnessen | 248/49 |
| 3,146,982 A | 9/1964 | Budnick | 248/68 |
| RE26,011 E * | 5/1966 | Girard | 248/68.1 |
| 3,539,234 A * | 11/1970 | Rapata | 308/238 |
| 3,568,959 A | 3/1971 | Blatt | 294/64 |
| 3,613,904 A | 10/1971 | Blatt | 214/1 BV |
| 3,664,654 A | 5/1972 | Manville | 269/9 |
| 3,677,584 A | 7/1972 | Short | 287/49 |
| D230,826 S | 3/1974 | Menshen | D8/230 |
| 3,920,295 A | 11/1975 | Speckin | 312/108 |
| 3,975,068 A | 8/1976 | Speckin | 312/254 |
| 4,036,289 A * | 7/1977 | Cheng et al. | 165/82 |
| 4,270,250 A * | 6/1981 | Schon | 248/67.5 X |
| 4,275,872 A | 6/1981 | Mullis | 269/72 |
| 4,307,864 A | 12/1981 | Benoit | 248/221.3 |
| 4,355,922 A | 10/1982 | Sato | 403/385 |
| 4,382,572 A | 5/1983 | Thompson | 248/484 |
| 4,480,497 A | 11/1984 | Locher | 74/531 |
| 4,495,834 A | 1/1985 | Bauer et al. | 74/493 |
| 4,515,336 A | 5/1985 | Fischer | 248/288.3 |
| D296,546 S | 7/1988 | Sachs | D13/13 |
| 4,805,938 A | 2/1989 | Redmond et al. | 280/47.35 |
| 4,941,481 A | 7/1990 | Wagenknecht | 606/59 |
| 4,957,318 A | 9/1990 | Blatt | 294/64.1 |
| 5,016,850 A | 5/1991 | Plahn | 248/206.3 |
| 5,069,433 A | 12/1991 | Womack | 269/277 |
| 5,123,547 A * | 6/1992 | Koch | 211/59.4 |
| 5,125,632 A | 6/1992 | Blatt et al. | 269/32 |
| RE34,120 E | 11/1992 | Plahn | |
| 5,192,058 A | 3/1993 | VanDalsem et al. | 269/24 |
| 5,222,854 A | 6/1993 | Blatt et al. | 414/225 |
| 5,261,715 A | 11/1993 | Blatt et al. | 294/88 |
| 5,271,651 A | 12/1993 | Blatt et al. | 294/88 |
| 5,299,847 A | 4/1994 | Blatt et al. | 294/88 |
| 5,377,939 A * | 1/1995 | Kirma | 248/68.1 |
| 5,452,981 A | 9/1995 | Crorey et al. | 414/225 |
| 5,492,443 A | 2/1996 | Crorey et al. | 414/744 |
| 5,516,173 A | 5/1996 | Sawdon | 294/86.4 |
| 5,632,588 A | 5/1997 | Crorey et al. | 414/225 |
| 5,647,625 A | 7/1997 | Sawdon | 294/86.4 |
| 5,660,363 A * | 8/1997 | Maglica | 248/288.31 |
| 5,941,513 A | 8/1999 | Moilanen et al. | 269/32 |
| 5,992,802 A * | 11/1999 | Campbell | 248/68.1 |

* cited by examiner

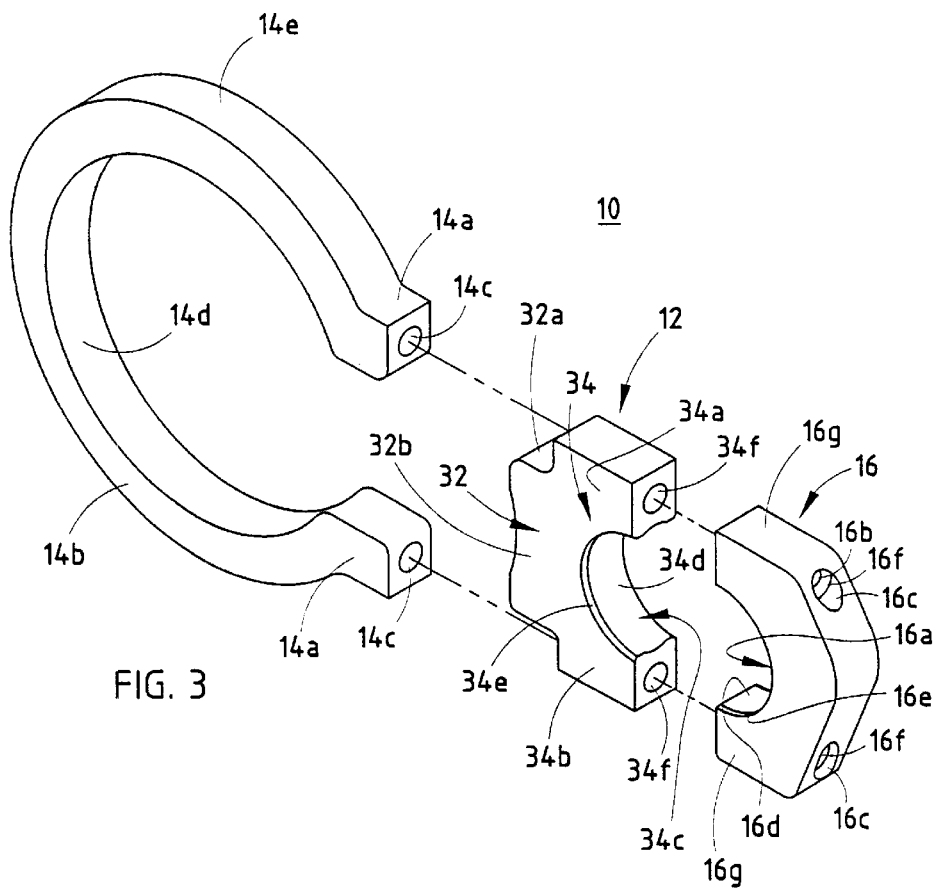
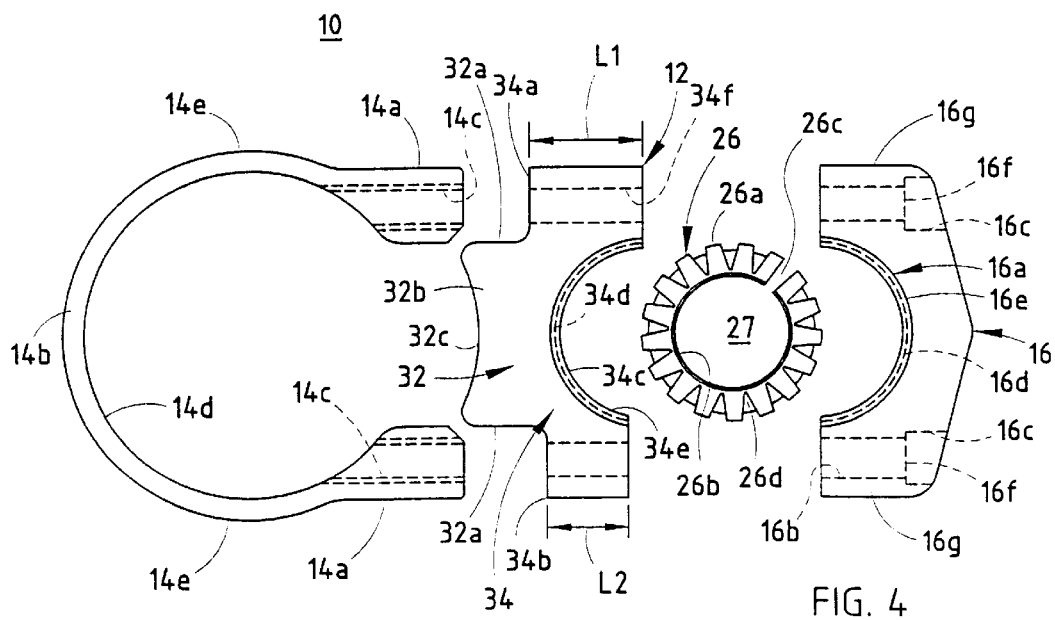

GRIPPER MOUNTING BRACKET

CROSS-REFERENCE TO RELATED APPLICATION

This application claims priority from U.S. Provisional Pat. Application, Ser. No. 60/187,339, filed Mar. 6, 2000, which is hereby incorporated in its entirety herein by reference.

BACKGROUND OF THE INVENTION

The present invention relates generally to mounting brackets for a gripper or other workpiece holder and, more particularly, to a mounting bracket which is pivotally mountable to a rod or support and which may pivotally receive the gripper.

Mounting brackets for mounting a gripper or workpiece holder or the like to a support structure are known. The mounting brackets engage a cylindrical portion of the gripper and mount to a cylindrical support rod or arm. Such grippers or workpiece holders are typically implemented at assembly lines or other industrial applications and connected to support structures along the assembly line or machines.

In order to provide pivotable adjustment of the gripper relative to the bracket, while further providing pivotable or rotational adjustment of the bracket relative to the support structure, brackets have been proposed which provide a cylindrical opening at one end for receiving the gripper therethrough and a second opening at the other end of the bracket. A partial spherical collar is rotatably received in the second opening and is slidable along the support rod or post. One of the proposed mounting brackets is a two piece mounting bracket or plate which is secured together by three fasteners, whereby the two plates define both of the openings therebetween. Accordingly, in order to adjust the position of the support structure and the gripper with respect to the bracket, at least two and maybe all three of the fasteners must be loosened, in order to loosen the clamping forces at both the post and the gripper.

Another proposed bracket which provides rotational adjustment with respect to the support post and pivotal adjustment of the gripper with respect to the bracket provides a one piece mounting bracket which is adjustable via a single fastener. However, because the gripper and support rod must be inserted into and along the respective openings of the bracket, such a mounting bracket is difficult to attach or detach from the gripper and/or support structure.

Other known gripper mounting brackets provide pivotable movement relative to the bracket and further provide pivotable movement of the bracket relative to the support post via a pair of generally cylindrical passageways through the gripper mounting bracket. The cylindrical passageways are defined between corresponding elements of the bracket, which are connected to one another via a pair of bolts or fasteners. Typically, the bolts or fasteners extend along the bracket and are spaced laterally outwardly from the openings defined within the bracket. Accordingly, such mounting brackets are relatively large and bulky, since additional material is required laterally outwardly from the openings for receiving the fasteners therethrough.

SUMMARY OF THE INVENTION

The present invention is intended to provide a gripper or workpiece holder mounting bracket which pivotally receives a gripper through one opening in the bracket and pivotally or rotatably mounts the bracket and gripper to a cylindrical support structure. The openings for the gripper and the support structure are defined by three members of the mounting bracket, which are secured together via one or more fasteners, whereby adjustment of the gripper and/or the bracket relative to the support structure may be accomplished by loosening a single fastener.

According to an aspect of the present invention, a workpiece holder mounting assembly for mounting a workpiece holder to an elongated support structure comprises a first mounting member, a second mounting member and a third mounting member. The second mounting member is attachable to a first end of the first mounting member, whereby the second mounting member and the first mounting member define a generally cylindrical opening therethrough. The generally cylindrical opening is adapted to receive a cylindrical portion of the workpiece holder therein. The third mounting member is attachable to an opposite end of the first mounting member, whereby the third mounting member and first mounting member define a second opening therethrough. The second opening is adapted to receive a pivot member which is positionable along the support structure. The mounting members are securable together by at least one fastener extending at least partially through the mounting members. Preferably, the mounting members are secured together by a pair of fasteners, wherein at least one of the fasteners is adjustable to adjust a clamping force at at least one of the openings through the mounting assembly.

According to another aspect of the present invention, a workpiece holder mounting assembly for mounting a workpiece holder to a support structure comprises a center member, a first end member and a second end member. The first end member is attachable at a first end of the center member, such that the first end member and center member define a generally circular opening therethrough. The generally circular opening is adapted to receive a cylindrical portion of the workpiece holder. The second end member is attachable at a second end of the center member. The second end member and center member define a second opening which is adapted to pivotally receive a swivel member therein. The swivel member is slidable along the support structure. The three members are secured together by a pair of fasteners extending longitudinally at least partially through each of the three members. The pair of fasteners are positioned laterally inwardly from an outermost lateral portion of the first opening of the mounting assembly.

According to another aspect of the present invention, a workpiece holder mounting assembly for mounting a workpiece holder to a support structure comprises a center member, a first end member and a second end member. The first end member is attachable at a first end of the center member. The first end member and the center member define a generally circular opening therethrough, which is adapted to receive the workpiece holder. The second end member is attachable at a second end of the center member. The second end member and center member define a second opening, which has an arcuate cross section therethrough. The second opening is adapted to receive a swivel ring, which is pivotable within the second opening and adapted to receive the support member therethrough. The three members of the workpiece holder are secured together by a pair of fasteners such that loosening at least one of the pair of fasteners reduces a clamping force at the generally circular opening and/or at the swivel ring within the second, arcuate cross section opening.

Preferably, the three members of the mounting assembly are secured together such that at least one gap is defined between the mounting members along at least one of the sides of the assembly. The fastener along the side with the gaps is then adjustable to reduce and/or increase the clamping force of the openings via expansion and/or compression of the gaps. Preferably, the swivel ring or member is generally a truncated spherical member which includes a curved outer surface and a cylindrical passageway therethrough which is adapted to receive the support structure. Preferably, the swivel ring is a split ring and includes a gap therealong, such that the clamping force of the swivel ring on the support structure is adjustable via compression and expansion of gap of the swivel ring via adjustment of at least one of the fasteners. Preferably, the swivel ring also includes a plurality of grooves extending therealong which limit pivotable movement of the swivel ring relative to the opening in the bracket when the fasteners are tightened.

Therefore, the present invention provides a three piece mounting bracket which is secured together and adjustable via one or two fasteners or bolts. The bracket allows for rotational movement of the gripper assembly within a cylindrical opening, while also allowing for pivotable and rotational adjustment of the mounting bracket with respect to a generally fixed support structure. Adjustment of the gripper with respect to the bracket and/or the bracket with respect to the support structure may be accomplished via adjustment of a single fastener. The lateral dimensions, of the overall bracket, and thus the material required to make the bracket, are reduced over the prior art, since the fasteners are preferably positioned and inset laterally inwardly from a laterally outermost portion of the curved portion of the bracket which engages and retains the gripper assembly. Additionally, because the mounting assembly is a three piece design, the components may be easily attached around a swivel member at the support structure.

BRIEF DESCRIPTION OF THE DRAWINGS

FIG. 3 is an exploded perspective view of the mounting bracket assembly of FIG. 2, with the swivel ring removed; and FIG. 4 is an exploded side elevation of the mounting bracket assembly of FIG. 2.

DESCRIPTION OF THE PREFERRED EMBODIMENTS

Figure 1:
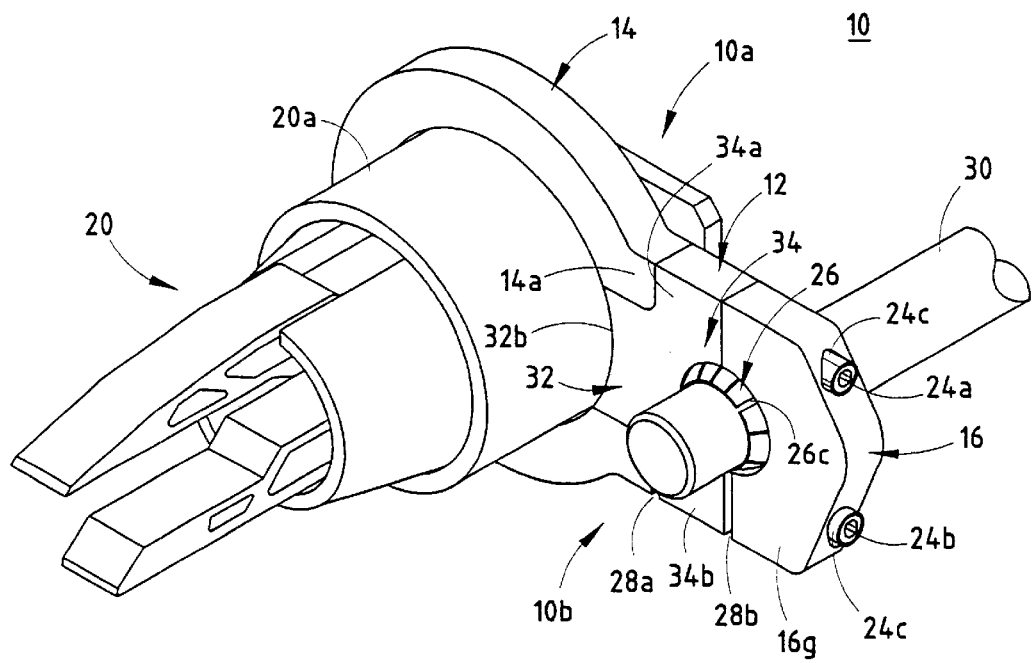
FIG. 1 is a perspective view of the mounting bracket assembly of the present invention as implemented with a gripper assembly and a rod support.

Referring now to the drawings and the illustrative embodiments depicted therein, a gripper or workpiece holder mounting bracket 10 is adapted to mount a workpiece holder 20, such as a gripper or other holder or tool or the like, to a support structure 30, such as a generally cylindrical rod or post, or other elongated, generally cylindrical support member (FIG. 1). Mounting bracket 10 includes three separate sections, a center section 12, an end section or ring clamping section 14 and a second end section or cap 16 (FIGS. 1–4). The larger ring section or member 14 and a correspondingly curved region 32b of center bracket section 12 together define a generally circular opening 18 (FIG. 2) in bracket 10, which pivotally receives workpiece holder 20. Center section 12 and end section 16 together define a second, generally circular opening 22 (FIG. 2) for pivotally receiving a donut swivel or swivel member or ring 26, which further receives support structure 30 therethrough. At least one fastener 24a, 24b, such as a conventional threaded bolt or the like, and preferably a pair of fasteners, are provided to retain the bracket sections 12, 14 and 16 together. Preferably, one or both fasteners 24a, 24b are adjustable to adjust a clamping force at either or both of the openings, as discussed below.

The circular opening 18 defined by the ring member 14 and center member 12 functions to secure the gripper or workpiece holder assembly 20 therein, while providing pivotal adjustment of the gripper assembly relative to the mounting assembly or bracket 10. The workpiece holder 20 is rotatably secured at a cylindrical portion 20a of the holder, which may be at a reduced diameter region, or at an outer circumference of the workpiece holder body, as shown in FIG. 1. The workpiece holder may be a gripper of the type disclosed in commonly assigned, U.S. patent application Ser. No. 09/606,962, filed Jun. 29, 2000 by Keith S. Attee for ADJUSTABLE STROKE GRIPPER ASSEMBLY now U.S. Pat. No. 6,361,095 (Attorney Docket No. CPI01 P-309), the disclosure of which is hereby incorporated herein by reference, or may be any known gripper, workpiece holder or other tool, holders or the like, such as conventional gripper assemblies or the like, without affecting the scope of the present invention.

The opening 22, which has an arcuate cross-section, is provided at an opposite end of the mounting bracket from opening 18 and functions to pivotally and rotatably receive the swivel member 26 therein. An outer surface of the swivel member slidably mates and swivels within the opening and forms a collar on a conventional mounting rod or post. The swivel member is pivotally received within the opening 22 and provides a generally cylindrical passageway therethrough which is adapted to slidably receive the cylindrical rod or post 30 for movably mounting the bracket to the post, as is known in the art.

As best shown in FIGS. 3 and 4, center section or element 12 of mounting bracket 10 is preferably generally T-shaped, with a base portion 32 extending longitudinally along bracket 10 from a laterally extending region 34 of center element 12. The laterally extending region 34 includes opposite end portions 34a and 34b and a curved portion 34c, which defines a portion of, and preferably approximately half of, opening 22. Curved portion 34c has an arcuate cross section which defines a curved surface 34d for engagement with an outer, correspondingly curved surface 26a of swivel member 26. Preferably, center element 12 includes a beveled portion 34e along curved portion 34c at one or both sides of mounting bracket 10, to increase the pivotal movement of mounting bracket 10 relative to support structure 30, as discussed below.

Each end 34a and 34b of laterally extending portion 34 preferably is bored longitudinally therethrough, to allow fasteners 24a and 24b to pass through cylindrical bores 34f, as discussed below. Preferably, one of the ends, such as 34a, has a greater length L1, than the length L2 of the other end 34b (FIG. 4), such that one or more gaps 28a and 28b (FIG. 2) are at least initially provided between ring member 14 and center element 12, and/or between end cap 16 and center element 12, respectively, at lateral end or side 34b. A lesser or even no gap is then provided between the same components at opposite lateral end 34a of center element 12, when fasteners 24a, 24b are tightened, as discussed below.

Base portion 32 of center element 12 extends from laterally extending portion 34 and has opposite lateral sides 32a and a curved portion 32b opposite lateral portion 34. Curved portion 32b includes a surface 32c which has substantially straight cross section and is curved to define a portion of opening 18. Preferably, curved portion 32b defines substantially less than half of opening 18, with ring member 14 defining the remaining portion of opening 18.

Figure 2:
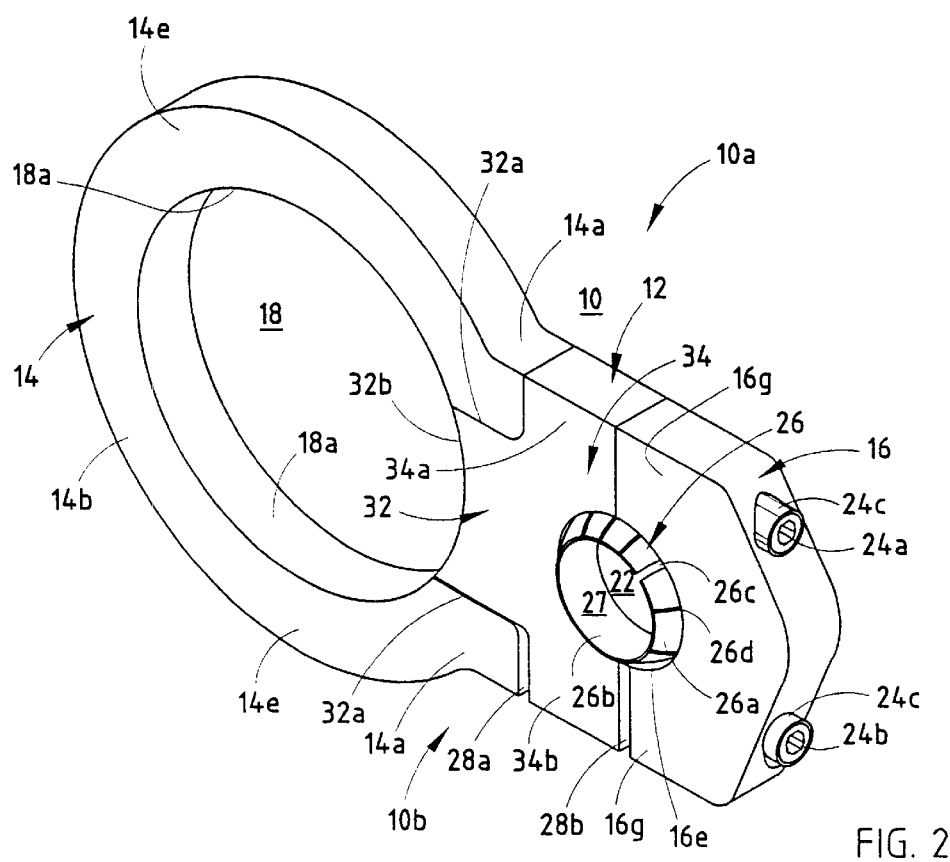
FIG. 2 is a perspective view of the mounting bracket assembly of FIG. 1.

Ring member 14 is curved in a partial circular or U shape and includes a pair of arms 14a which extend from a curved portion 14b. Each arm 14a preferably includes a threaded bore 14c at least partially therethrough to receive and engage threaded fasteners 24a and 24b. Curved portion 14b includes a substantially flat, annular surface 14d which defines greater than half of opening 18. Preferably, arms 14a, and thus threaded bores 14c, are positioned laterally inwardly of a laterally outward portion 14e of ring member 14 and thus of a laterally outward portion 18a of opening 18 (FIG. 2).

End cap 16 includes a curved region 16a which defines a portion of opening 22 and is adapted to pivotally receive the swivel member 26 between end cap 16 and center element 12, as discussed below. Similar to curved portion 34c of center element 12, curved portion 16a has an arcuate cross section defined by a curved surface 16d. Additionally, end cap 16 preferably includes a beveled portion 16e along each side of curved portion 16a.

End cap 16 further includes a pair of laterally opposite mounting portions 16g with a pair of cylindrical bores 16b therethrough for receiving threaded fasteners 24a and 24b. Preferably, these cylindrical bores 16b are countersunk at an outer end 16c to allow the heads 24c of fasteners 24a and 24b (FIGS. 1 and 2) to at least partially seat within the countersunk portion. Outer end 16c of bores 16b thus has a greater diameter than cylindrical bore 16b and defines a stepped surface 16f for engagement of fastener heads 24c as the fasteners 24a, 24b are tightened within mounting assembly 10.

Swivel member or donut swivel 26 is preferably a truncated spherical member, which includes an outer, curved or partially spherical surface 26a and an inner, annular surface 26b which defines a generally cylindrical passageway 27 through swivel member 26. Preferably, swivel member 26 is a split ring, and has a gap or slot 26c extending along swivel member 26 to allow flexing of swivel member 26 to decrease or increase the diameter of the passageway 27 via compression or expansion of gap 26c. This allows swivel member 26 to tighten its grip on support structure 30 as swivel member 26 is compressed between end cap 16 and center element 12, as discussed below. Swivel member 26 also preferably includes a plurality of notches or grooves 26d extending along its outer surface 26a which function to enhance gripping of swivel member 26 at surfaces 34d and 16d within opening 22.

When assembled, as shown in FIGS. 1 and 2, the gripper mounting opening 18 and the swivel ring mounting opening 22 are defined by the three bracket sections 12, 14, 16. Gripper mounting opening 18 is defined by center element 12 and ring section 14, while the mounting opening 22 for swivel member 26 is defined by center element 12 and end cap 16. Workpiece holder or tool 20 and support rod 30 are therefore clamped by different elements or mounting sections. More particularly, base portion 32 of center element 12 is positioned between arms 14a of ring member 14, with arms 14a extending along sides 32a of base portion 32 of center element 12, such that curved portion 32b corresponds with curved portion 14b to define opening 18, which further defines a generally cylindrical passageway therethrough. The surfaces 14d and 32c are adapted to engage cylindrical portion 20a of workpiece holder 20 to pivotally retain the workpiece holder within opening 18.

End cap 16 engages lateral ends 34a, 34b of center element 12 opposite ring member 14, such that surface 34d of curved portion 34c and surface 16d of curved portion 16a correspondingly define opening 22. Swivel member 26 is positioned between curved portions 34c and 16a of center member 12 and end cap 16, respectively, such that swivel member 26 is pivotally received within the arced or curved opening 22 defined by center element 12 and end cap 16. Although described as defining a curved or arcuate opening 22 between end cap 16 and center bracket 12, it is further envisioned that the surfaces 16d and 34d could define an opening or passageway that is generally spherical and which is defined by a plurality of ridges or ribs extending therearound to engage corresponding portions of swivel member 26, and thus allow for rotation and pivotable movement of swivel member 26 relative to bracket 10, without affecting the scope of the present invention.

Preferably, one of arms 14a of ring member 14 contacts lateral end portion 34a of center element 12, while gap 28a is provided between the other arm 14a and lateral end portion 34b. Similarly, gap 28b is provided between end portion 34b and one of mounting portions 16g of cap member 16, while the other mounting portion 16g engages lateral end portion 34a of center element 12. When assembled, bores 14c, 34f and 16b are generally aligned with one another for insertion of fasteners 24a, 24b therethrough.

Fasteners 24a and 24b extend through the corresponding cylindrical bores 16b of end cap 16 and bores 34f of center element 12, and threadedly engage the threaded bores 14c within ring member 14, to secure the three components together. Workpiece holder 20 may be positioned within opening 18 and may be at least initially pivotable therewithin, prior to tightening of one or both of fasteners 24a, 24b. Swivel member 26 is positioned within opening 22 and is similarly at least initially pivotable therewithin prior to tightening of the fasteners. When fastener 24a is tightened, the three elements 12, 14 and 16 are preferably secured tightly together along one side 10a of bracket 10 (no gaps). As fastener 24b is tightened, the gaps 28a, 28b along the other side 10b of bracket 10 may be compressed to increase the clamping force on the workpiece holder and/or the swivel member and thus the support structure, in order to clamp and secure workpiece holder 20 and support structure 30 within bracket 10. The grooves 26c of swivel member 26 function to enhance gripping of swivel member 26 within opening 22, as the end cap 16 is pulled closer to center element 12 via tightening of fasteners 24a and 24b in bracket 10. This reduces the torque requirement to get sufficient clamping of swivel member 26, and thus support post 30, by bracket 10. Swivel member 26 may also or otherwise be roughened to further enhance gripping, as is known in the art, without affecting the scope of the present invention.

Because gaps 28a and 28b are preferably positioned along only one side 10b of bracket 10, the sections 12, 14, 16 along the opposite side 10a of bracket 10 provide a tight fit (no gaps) when fastener 24a is tightened therealong, while the gaps on the other side 10b of bracket 10 facilitate adjustment of a clamping force of bracket 10 about workpiece holder 20 and/or support structure 30 as fastener 24b is tightened or loosened. The clamping force exerted by bracket 10 at workpiece holder 20 and support structure 30 may thus be adjusted to allow rotational adjustment of the holder 20 relative to bracket 10 and pivotal adjustment of mounting bracket 10 with respect to the cylindrical support structure or post 30, by tightening or loosening a single fastener (24b), while the other fastener 24a retains the bracket 10 together. Preferably, as best seen in FIG. 4, the gaps are provided by a generally symmetrical end cap 16 and a generally symmetrical partial ring section 14, which attach to a center section 12 which has differing widths of the two, opposite laterally extending portions. However, the end cap and/or ring section may be otherwise formed to engage a symmetrical or asymmetrical center section, such that gaps are otherwise provided between the components, without affecting the scope of the present invention. Alternately, gaps may be provided between the elements along both sides of the mounting bracket, without affecting the scope of the present invention.

Therefore, the present invention provides a one or two bolt and three piece gripper or workpiece holder mounting bracket, which allows for rotational movement of a gripper or workpiece holder within a cylindrical opening, while also allowing for pivotable and rotational adjustment of the mounting bracket with respect to a generally fixed support structure. Adjustment of either the gripper assembly or workpiece holder within the cylindrical opening and/or the support post and/or the spherical collar within the partial spherical opening is easily performed via adjustment of a single fastener.

Additionally, the lateral dimensions of the overall bracket, and thus the material required to make the bracket, are reduced over the prior art, since the fasteners are positioned and inset laterally inwardly of an outermost diameter of the curved portion of the bracket which engages and retains the gripper assembly. The partial-circular ring section is preferably formed to define more than half of the circular opening, such that the mounting arms are curved inwardly from an outermost laterally extending region at each side of the circular portion or ring. Accordingly, the threaded fasteners, along with the center section and the end cap, may be positioned entirely laterally inwardly of the outermost lateral curvature of the curved ring. This is a substantial improvement over the prior art, since this allows the mounting bracket to have a narrower overall width and a lighter overall weight, while still providing sufficient clamping force of the bracket about the gripper assembly and support structure.

Changes and modifications in the specifically described embodiments can be carried out without departing from the principles of the invention, which is intended to be limited only by the scope of the appended claims, as interpreted according to the principles of patent law.

The embodiments of the invention in which an exclusive property or privilege is claimed are defined as follows:

1. A workpiece holder mounting assembly for mounting a workpiece holder to an elongated support structure, said mounting assembly comprising:
   a first mounting member having a first end and a second end opposite said first end;
   a second mounting member attachable at said first end of said first mounting member, said second mounting member and said first mounting member defining a first opening, said first opening being generally cylindrical and adapted to receive a cylindrical portion of the workpiece holder therein; and
   a third mounting member attachable at said second end of said first mounting member, said third mounting member and said first mounting member defining a second opening, whereby said second opening is adapted to pivotally receive a pivot member which is positionable along the support structure, said third mounting member, said first mounting member and said second mounting member being securable together by at least one fastener extending at least partially through said third mounting member, said first mounting member and said second mounting member, said pivot member comprising a truncated spherical member having a cylindrical opening therethrough which is adapted to receive the support structure, wherein said first and third mounting members include a beveled portion around said second opening.

2. The mounting assembly of claim 1, wherein said at least one fastener is adjustable to adjust a clamping force at at least one of said first and second openings.

3. The mounting assembly of claim 2, wherein at least one of the workpiece holder and said pivot member are pivotable with respect to said first, second and third mounting members in response to a reduction in the clamping force.

4. The mounting assembly of claim 2, wherein said at least one fastener comprises a pair of fasteners extending along opposite sides of said mounting assembly, one of said fasteners being adjustable to adjust the clamping force while the other of said fasteners retains said first, second and third mounting members together.

5. The mounting assembly of claim 1, wherein said pivot member comprises a split member with a gap extending therealong, said at least one fastener being adjustable to adjust a clamping force on the support structure via expansion or compression of said gap.

6. The mounting assembly of claim 1, wherein said pivot member includes a plurality of grooves extending therealong, said grooves enhancing gripping of said pivot member within said second opening.

7. A workpiece holder mounting assembly for mounting a workpiece holder to a support structure, said mounting assembly comprising:
   a center member having a first end and a second end opposite said first end;
   a first end member attachable at said first end of said center member, said first end member and said center member defining a first opening, said first opening being generally circular and adapted to receive a cylindrical portion of the workpiece holder therethrough; and
   a second end member attachable at said second end of said center member, said second end member and said center member defining a second opening, whereby said second opening is adapted to pivotally receive a swivel member, said second end member, said center member and said first end member being secured together by a pair of fasteners extending longitudinally at least partially through said second end member, said center member and said first end member, said pair of fasteners being positioned laterally inwardly of an outermost lateral portion of said first opening, said first end member being generally U-shaped and having a pair of mounting arms which receive an extension of said center member therebetween, said fasteners extending at least partially through a laterally extending portion of said center member and said pair of mounting arms of said first end member, wherein said first end member includes a partial ring portion which defines more than half of said first opening and extends laterally outwardly from said mounting arms and said laterally extending portion of said center member.

8. The mounting assembly of claim 7, wherein at least one of said pair of fasteners is adjustable to adjust a clamping force at at least one of said first and second openings.

9. The mounting assembly of claim 8, wherein said mounting arms of said first end member and said laterally extending portions of said center member define a first gap therebetween along at least one side of said mounting assembly, and said second end member and said laterally extending portions of said center member define a second gap therebetween along said at least one side, at least one of said fasteners extending at least partially through said second end member, said second gap, said laterally extending portion of said center member, said first gap, and said mounting arm of said first end member, whereby the clamping force is adjusted via expansion and compression of said first and second gaps.

10. The mounting assembly of claim 7, wherein said swivel member comprises a truncated spherical member which is pivotable within said second opening, said swivel member defining a cylindrical passageway therethrough which is adapted to receive the support structure.

11. A workpiece holder mounting assembly for mounting a workpiece holder to a support structure, said mounting assembly comprising:
   a center member having a first end and a second end opposite said first end;
   a first end member attachable at said first end of said center member, said first end member and said center member defining a first opening which is generally circular, said first opening being adapted to receive the workpiece holder; and
   a second end member attachable at said second end of said center member, said second end member and said center member defining a second opening which defines an arcuate cross-section, whereby said second opening is adapted to receive a swivel ring, said swivel ring being pivotable within said second opening and adapted to receive the support member therethrough, said second end member, said center member and said first end member being secured together by a pair of fasteners such that loosening at least one of said pair of fasteners reduces a clamping force at at least one of said first opening and said swivel ring within said second opening, said center member being attachable between said first and second end members at opposite lateral sides thereof, wherein at least one gap is defined between at least one of said sides of said center member and at least one of said first and second end members, at least one of said fasteners being adjustable to adjust the clamping force via expansion and compression of said at least one gap.

12. The mounting assembly of claim 11, wherein said pair of fasteners are positioned laterally inwardly of an outermost lateral portion of said first end member.

13. A workpiece holder mounting assembly for mounting a workpiece holder to a support structure, said mounting assembly comprising:
   a center member having a first end and a second end opposite said first end;
   a first end member attachable at said first end of said center member, said first end member and said center member defining a first opening which is generally circular, said first opening being adapted to receive the workpiece holder; and
   a second end member attachable at said second end of said center member, said second end member and said center member defining a second opening which defines an arcuate cross-section, whereby said second opening is adapted to receive a swivel ring, said swivel ring being pivotable within said second opening and adapted to receive the support member therethrough, said second end member, said center member and said first end member being secured together by a pair of fasteners such that loosening at least one of said pair of fasteners reduces a clamping force at at least one of said first opening and said swivel ring within said second opening, wherein said swivel ring comprises a truncated spherical member which includes a curved outer surface and a cylindrical passageway therethrough which is adapted to receive the support structure therethrough, said curved outer surface being engagable with said second opening, said swivel ring being pivotable within said second opening when the clamping force is reduced.

14. The mounting assembly of claim 13, wherein said center member is attachable between said first and second end members at opposite lateral sides thereof.

15. The mounting assembly of claim 13, wherein said swivel ring includes a plurality of grooves extending therealong which limit pivotal movement of said swivel ring relative to said second opening when said fasteners are tightened.

16. The mounting assembly of claim 13, wherein said swivel ring includes a gap therealong such that a clamping force of said swivel ring on the support structure is adjustable via compression and expansion of said gap via adjustment of at least one of said fasteners.

17. A workpiece holder mounting assembly for mounting a workpiece holder to a support structure, said mounting assembly comprising:
   a center member having a first end and a second end opposite said first end;
   a first end member attachable at said first end of said center member, said first end member and said center member defining a first opening which is generally circular, said first opening being adapted to receive the workpiece holder; and
   a second end member attachable at said second end of said center member, said second end member and said center member defining a second opening, said second opening being adapted to adjustably mount said mounting assembly to the support structure, opposed portions of said second end member and said center member defining at least one gap therebetween, said second end member, said center member and said first end member being secured together by at least one fastener which bridges said at least one gap between said opposed portions of said second end member and said second end of said center member, said at least one gap being expandable and contractable in response to adjusting said at least one fastener to adjust a clamping force at said second opening, said second opening defining an arcuate cross-section and being adapted to receive a swivel ring, said swivel ring being pivotable within said second opening and adapted to receive the support member therethrough, wherein said swivel ring comprises a truncated spherical member which includes a curved outer surface and a cylindrical passageway therethrough which is adapted to receive the support structure therethrough, said curved outer surface being engagable with said second opening, said swivel ring being pivotable within said second opening when the clamping force is reduced.

18. The mounting assembly of claim 17, wherein said center member is attachable between said first and second end members at opposite lateral sides thereof.

19. The mounting assembly of claim 17, wherein said swivel ring includes a plurality of grooves extending therealong which limit pivotal movement of said swivel ring relative to said second opening when said fasteners are tightened.

20. The mounting assembly of claim 17, wherein said swivel ring includes a gap therealong such that a clamping force of said swivel ring on the support structure is adjustable via contraction and expansion of said gap via adjustment of said at least one fastener.

21. The mounting assembly of claim 12, wherein said at least one fastener comprises a pair of fasteners extending through and along opposite sides of said first and second end members and said center portion, at least one of said pair of fasteners extending through said at least one gap.

22. The mounting assembly of claim 21, wherein said at least one gap comprises a single gap at one side of said center member and said second end member, opposed portions of said center member and said second end member on the opposite side of said one side being abutted against each other.

23. The mounting assembly of claim 21, wherein said pair of fasteners are positioned laterally inwardly of an outermost lateral portion of said first end member.

24. The mounting assembly of claim 21, wherein said first end member comprises a generally U-shaped member and has a pair of mounting arms which receive an extension of said center member therebetween, said pair of fasteners extending at least partially through a laterally extending portion of said center member and said pair of mounting arms of said first end member.

* * * * *

UNITED STATES PATENT AND TRADEMARK OFFICE
CERTIFICATE OF CORRECTION

PATENT NO. : 6,578,801 B2
DATED : June 17, 2003
INVENTOR(S) : Keith S. Attee

It is certified that error appears in the above-identified patent and that said Letters Patent is hereby corrected as shown below:

Column 11,
Line 6, "Claim 12" should be -- Claim 17 --.

Signed and Sealed this

Third Day of January, 2006

JON W. DUDAS
*Director of the United States Patent and Trademark Office*